(12) United States Patent
Takeshita (10) Patent No.: US 7,446,802 B2
(45) Date of Patent: Nov. 4, 2008

(54) IMAGE PROCESSING UNIT, ELECTRONIC CAMERA, AND IMAGE PROCESSING PROGRAM FOR DETERMINING PARAMETERS OF WHITE BALANCE ADJUSTMENT TO BE APPLIED TO AN IMAGE

(75) Inventor: Tetsuya Takeshita, Yokohama (JP)

(73) Assignee: Nikon Corporation, Tokyo (JP)

( * ) Notice: Subject to any disclaimer, the term of this patent is extended or adjusted under 35 U.S.C. 154(b) by 716 days.

(21) Appl. No.: 10/841,551

(22) Filed: May 10, 2004

(65) Prior Publication Data

US 2004/0239774 A1    Dec. 2, 2004

(30) Foreign Application Priority Data

May 26, 2003    (JP)    ............... 2003-147894

(51) Int. Cl.
    *H04N 9/73*    (2006.01)
(52) U.S. Cl. .................................. 348/223.1
(58) Field of Classification Search ........................ None
    See application file for complete search history.

(56) References Cited

U.S. PATENT DOCUMENTS

| 5,270,802 A | 12/1993 | Takagi et al. |
| 5,541,649 A | 7/1996 | Yamamoto et al. |
| 6,727,942 B1 | 4/2004 | Miyano |
| 6,906,744 B1 | 6/2005 | Hoshuyama et al. |
| 2002/0167596 A1 | 11/2002 | Suzuki et al. |
| 2003/0001958 A1 | 1/2003 | Hoshuyama |

FOREIGN PATENT DOCUMENTS

| JP | A 08-322061 | 12/1996 |
| JP | A 11-205812 | 7/1999 |
| JP | A 2000-092509 | 3/2000 |
| JP | A 2001-103508 | 4/2001 |

*Primary Examiner*—Tuan V Ho
(74) *Attorney, Agent, or Firm*—Oliff & Berridge, PLC (57) ABSTRACT

An image processing unit, electronic camera, and image processing program have low probability of failure and high probability of success in white balance adjustment. The image processing unit includes: a first setting unit setting a value of a first adjusting parameter for white balance adjustment applied to an image of a subject; a calculation unit calculating a deviation in the balance of a color signal when an area of the image detected by achromatic color detection is subjected to white balance adjustment with the first adjusting parameter; and a second setting unit setting the as-is value of the first adjusting parameter as a second adjusting parameter when the deviation is equal to or more than a threshold value, correcting the value of the first adjusting parameter in a direction of reducing the deviation and setting it as the second adjusting parameter when the deviation is less than the threshold value.

11 Claims, 7 Drawing Sheets

IMAGE PROCESSING UNIT, ELECTRONIC CAMERA, AND IMAGE PROCESSING PROGRAM FOR DETERMINING PARAMETERS OF WHITE BALANCE ADJUSTMENT TO BE APPLIED TO AN IMAGE

CROSS-REFERENCE TO RELATED APPLICATIONS

This application is based upon and claims the benefit of priority from the prior Japanese Patent Application No. 2003-147894, filed on May 26, 2003, the entire contents of which are incorporated herein by reference.

BACKGROUND OF THE INVENTION

1. Field of the Invention

The present invention relates to an image processing unit for determining parameters of white balance adjustment to be applied to an image of a subject, an electronic camera having the function of determining the parameters thereof, and an image processing program for determining the parameters thereof.

2. Description of the Related Art

A general electronic camera has an automatic white balance adjustment function, which expresses a white object in white color irrespective of lighting color.

The following methods (1), (2), and the like are typical methods of the white balance adjustment.

In the method (1), lighting color is judged on the basis of the average color of the whole image of a subject. Using a parameter (white balance gain ($g_r$, $g_b$)) in accordance with the lighting color, the white balance adjustment (multiplication of a signal with the white balance gain ($g_r$, $g_b$)) is carried out.

In the method (2), an achromatic color area is searched through an image of a subject, and lighting color is judged on the basis of the color of the achromatic color area. The white balance adjustment is carried out with white balance gain ($g_r$, $g_b$) in accordance with the judged lighting color (refer to Japanese Unexamined Patent Application Publication Nos. 8-322061, 11-205812, and the like).

The method (1), however, is based on a gray principle (a precondition that the average of object color in the whole image is achromatic color). Thus, when the method (1) is applied to an image which has a bias in the object color (for example, an image of the sea, an image of a lawn, an image of a red wall and the like), the bias of the object color is regarded as the bias of the lighting color, resulting in wrong judgment which may cause failure in the white balance adjustment.

The method (2), on the other hand, is based on a precondition that the lighting color is any of predetermined plural kinds of color (for example, the color of natural light, the color of fluorescent light, and the color of a filament lamp). Thus, when the method (2) is applied to an image of a subject which is illuminated with unexpected lighting color, a chromatic color area is regarded as the achromatic color area under specific lighting color, resulting in wrong judgment which may cause failure in the white balance adjustment.

To reduce the failure described above, a method (3) is proposed.

In the method (3), two judgment results (two lighting colors) by the methods (1) and (2) are averaged with weight based on shooting conditions during taking an image, and the distribution of color in the image. White balance gain ($g_r$, $g_b$) is determined in accordance with the averaged lighting color.

As in the method (3), however, when a plurality of judgment results which are different from each other are averaged, the probability of failure (big failure) in the white balance adjustment is reduced, but the probability of success (big success) in the white balance adjustment is also reduced.

SUMMARY OF THE INVENTION

An object of the present invention is to provide an image processing unit, an electronic camera, and an image processing program which have low probability of failure and high probability of success in white balance adjustment.

An image processing unit according to the present invention includes a first setting unit, a calculation unit, and a second setting unit. The first setting unit sets a value of a first adjusting parameter for white balance adjustment to be applied to an image of a subject. When an area of the image detected by achromatic color detection is subjected to the white balance adjustment with the first adjusting parameter, the calculation unit calculates a deviation in the balance of a color signal. The second setting unit sets the as-is value of the first adjusting parameter as a second adjusting parameter when the deviation is equal to or more than a threshold value. The second setting unit corrects the value of the first adjusting parameter in a direction of reducing the deviation and sets the corrected value as the second adjusting parameter when the deviation is less than the threshold value.

It is preferable that the image processing unit according to the present invention further includes an adjustment unit in which the whole image is subjected to the white balance adjustment with the second adjusting parameter.

An electronic camera according to the present invention includes an imaging sensor for taking an image of a subject, and a circuit part for carrying out calculation on the basis of the image output from the imaging sensor. The circuit part includes a first setting unit, a calculation unit, and a second setting unit. The first setting unit sets a value of a first adjusting parameter for white balance adjustment to be applied to an image of a subject. When an area of the image detected by achromatic color detection is subjected to the white balance adjustment with the first adjusting parameter, the calculation unit calculates a deviation in the balance of a color signal. The second setting unit sets the as-is value of the first adjusting parameter as a second adjusting parameter when the deviation is equal to or more than a threshold value. The second setting unit corrects the value of the first adjusting parameter in a direction of reducing the deviation and sets the corrected value as the second adjusting parameter when the deviation is less than the threshold value.

It is preferable that the circuit part according to the present invention further includes an adjustment unit in which the whole image is subjected to the white balance adjustment with the second adjusting parameter.

It is also preferable that the first setting unit according to the present invention sets the value of the first adjusting parameter on the basis of lighting color of the subject, which is judged by two or more kinds of methods different from each other.

It is also preferable that the first setting unit according to the present invention sets the value of the first adjusting parameter in accordance with user input.

It is also preferable that according to the present invention, the threshold value of the deviation corresponds to a difference in color rendering property in the same kind of lighting.

It is also preferable that according to the present invention, the threshold value of the deviation in a direction of green color is smaller than the threshold value of the deviation in a direction opposite to green color.

An image processing program according to the present invention is a computer-readable image processing program for subjecting an image of a subject to white balance adjustment. The image processing program includes a first setting step, a calculation step, and a second setting step. A value of a first adjusting parameter for the white balance adjustment to be applied to the image of the subject is set in the first setting step. When an area of the image detected by achromatic color detection is subjected to the white balance adjustment with the first adjusting parameter, a deviation in the balance of a color signal is calculated in the calculation step. In the second setting step, the as-is value of the first adjusting parameter is set as a second adjusting parameter when the deviation is equal to or more than a threshold value. The value of the first adjusting parameter is corrected in a direction of reducing the deviation and set as the second adjusting parameter when the deviation is less than the threshold value.

It is preferable that the image processing program according to the present invention further includes an adjustment step in which the whole image is subjected to the white balance adjustment with the second adjusting parameter.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Embodiments of the present invention will be hereinafter described with reference to the drawings.

First Embodiment

The first embodiment of the present invention will be hereinafter described with reference to FIGS. 1 to 4.

This is an embodiment of an electronic camera.

Figure 1:
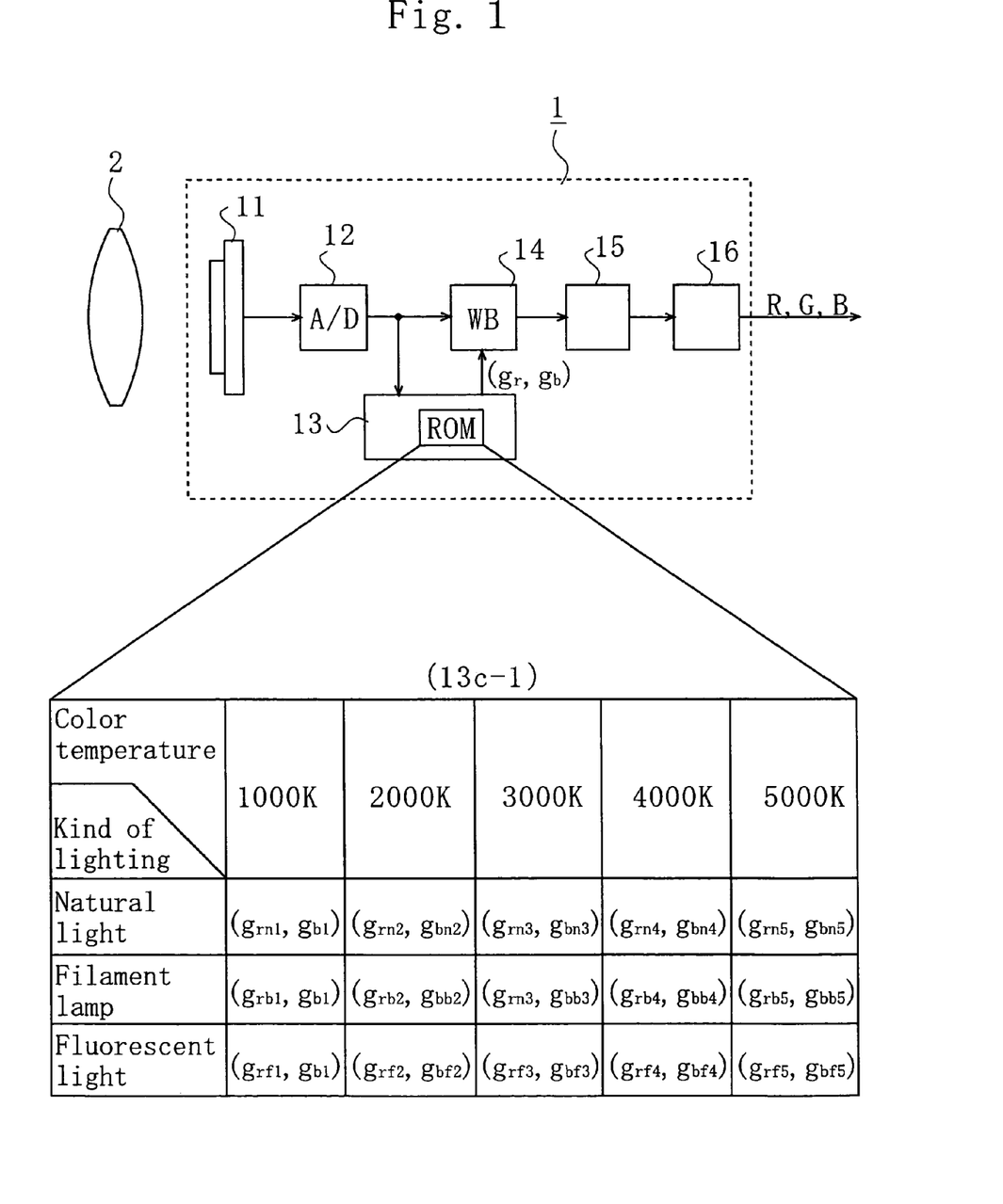
FIG. 1 is a block diagram showing the schematic structure of an electronic camera according to a first embodiment of the invention.

FIG. 1 is a block diagram showing the schematic structure of the electronic camera according to this embodiment.

The electronic camera includes a camera body 1 and a taking lens 2.

The camera body 1 includes an imaging sensor 11, an A/D converter 12, a setting circuit 13, a white balance circuit 14, a color interpolation circuit 15, a gray-scale transformation processing circuit 16 and the like. The setting circuit 13 and the white balance circuit 14 correspond to a circuit part and an image processing unit in claims, respectively.

The taking lens 2 forms an image of a subject on the imaging sensor 11.

Each pixel signal (R, G, B) of each image output from the imaging sensor 11 is stored in a not-illustrated recording medium through the A/D converter 12, the white balance circuit 14, the color interpolation circuit 15, and the gray-scale transformation processing circuit 16.

The A/D converter 12 converts each pixel signal (R, G, B) into a digital signal. The digital signal is subjected to white balance adjustment in the white balance circuit 14. Then, the digital signal is subjected to color interpolation processing in the color interpolation circuit 15, and to gray-scale transformation processing in the gray-scale transformation processing circuit 16.

In the white balance adjustment, the white balance circuit 14 multiplies each pixel signal (R, G, B) by white balance gain ($g_r$, $g_b$) (corresponding to the second adjusting parameter in claims), in the manner as shown by ($g_r \times R$, G, $g_b \times B$).

The white balance gain ($g_r$, $g_b$) is set for each image by the setting circuit 13, which includes an operating circuit, RAM, ROM, and the like.

The setting circuit 13 determines the white balance gain ($g_r$, $g_b$) to be set in the white balance circuit 14, with reference to the pixel signals (R, G, B) of an image output from the A/D converter 12, and a lookup table 13c-1 stored in advance in the ROM of the setting circuit 13. The setting circuit 13 then sets the white balance gain ($g_r$, $g_b$) in the white balance circuit 14.

In the lookup table 13c-1, for example, as shown in FIG. 1, the white balance gain ($g_r$, $g_b$) which is optimum for each combination of a kind of lighting and color temperature is stored in advance.

The operation of the setting circuit 13 when setting the white balance gain ($g_r$, $g_b$) for a given image I will be hereinafter described in detail.

Figure 2:
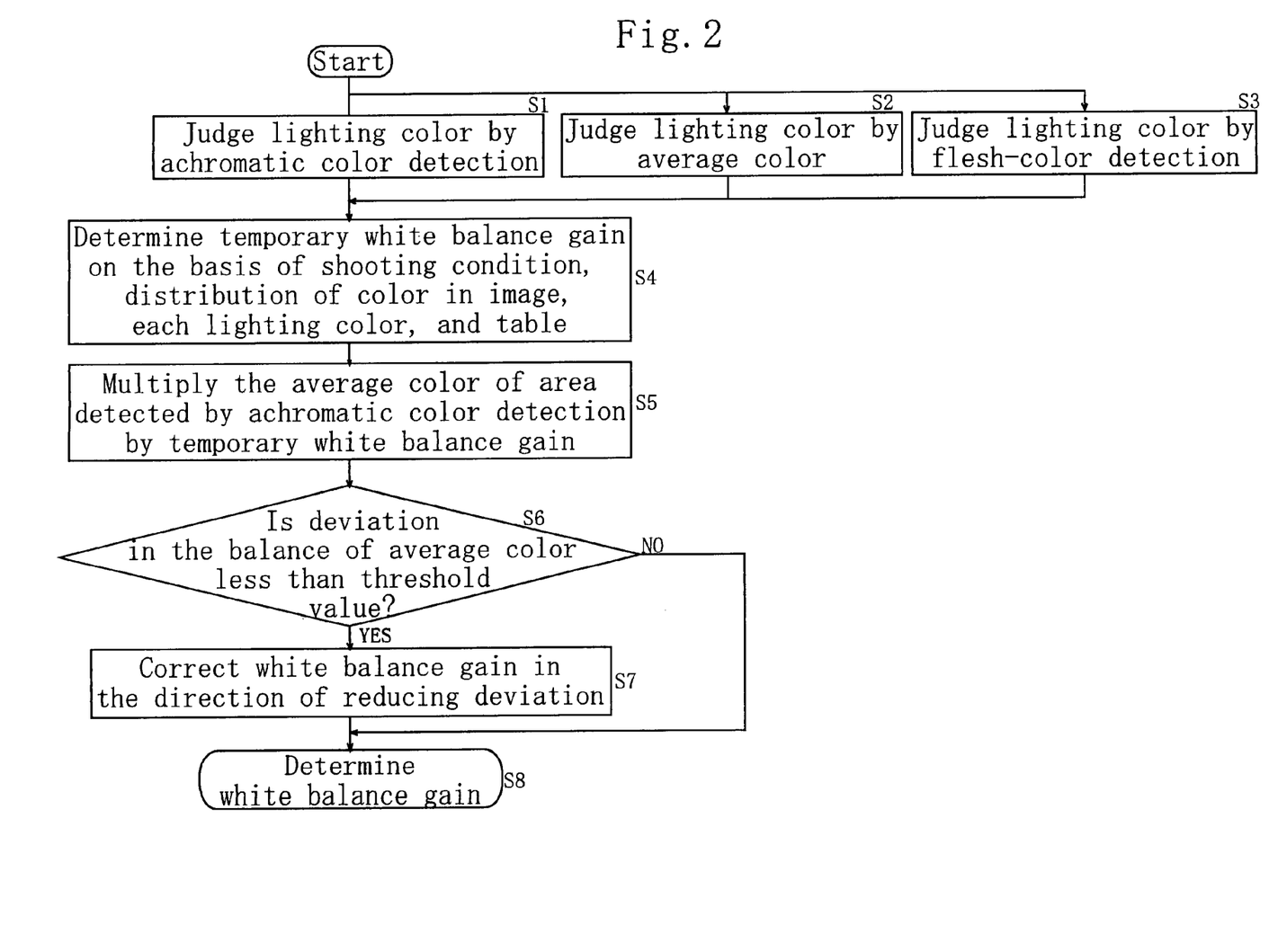
FIG. 2 is a flow chart showing the operation of a setting circuit 13 according to the first embodiment of the invention.

FIG. 2 is a flow chart showing the operation of the setting circuit 13 according to this embodiment.

First, using the three kinds of methods different from one another, the lighting color of the image I is judged by the pixel signals (R, G, B) of the image I (steps S1, S2, and S3 of FIG. 2).

The first method is a judgment method by the achromatic color detection of the image I (step S1 of FIG. 2). The second method is a judgment method by the average color of the whole image I (step S2 of FIG. 2), and the third method is a judgment method by the flesh-color detection of the image I (step S3 of FIG. 2).

Figure 3:
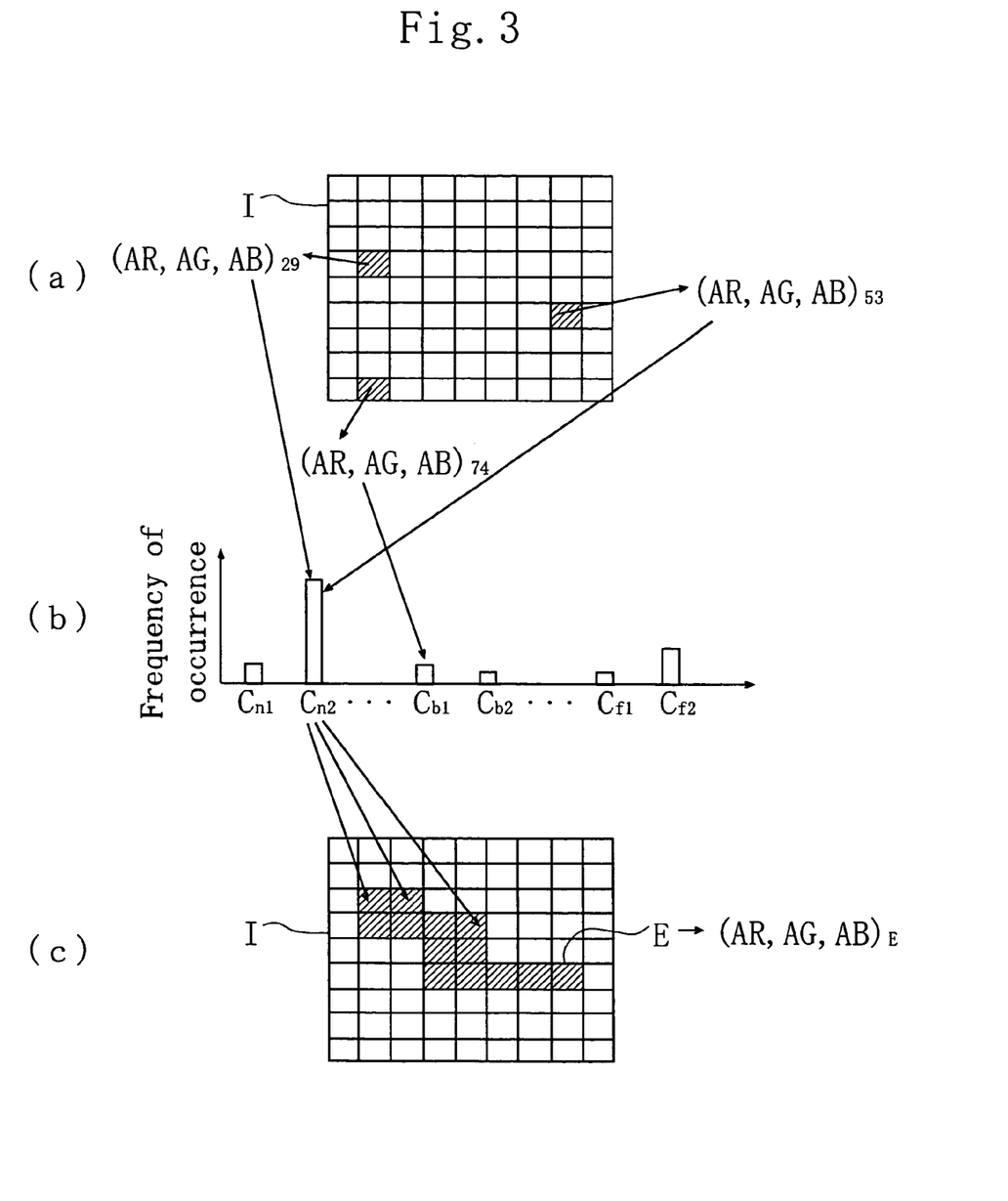
FIG. 3 is an explanatory view which explains a judgment method by achromatic color detection.

In the judgment method by the achromatic color detection (step S1 of FIG. 2), as shown in FIG. 3(a), the average color $(AR, AG, AB)_i$ (i=1, 2, 3, ...) of each small area i (i=1, 2, 3, ...) of the image I is first calculated. The average color $(AR, AG, AB)_i$ is the average value (or the integrated value) of respective pixel signals (R, G, B) in the small area i.

Then, it is judged whether or not the obtained average color $(AR, AG, AB)_i$ (i=1, 2, 3, ...) of each small area i belongs to any of predetermined plural colors $C_{n1}, C_{n2}, C_{n3}, \ldots, C_{b1}, C_{b2}, C_{b3}, \ldots, C_{f1}, C_{f2}, C_{f3}, \ldots$, and to which color. When it is judged that the average color $(AR, AG, AB)_i$ belongs to any of the colors, one is added to the frequency of occurrence (the number of small areas) of the corresponding color.

Here, each of the colors $C_{n1}$, $C_{n2}$, $C_{n3}$, ..., $C_{b1}$, $C_{b2}$, $C_{b3}$, ..., $C_{f1}$, $C_{f2}$, $C_{f3}$, ..., is a color which an achromatic color object represents under each kind of lighting assumed in advance.

The colors $C_{n1}$, $C_{n2}$, $C_{n3}$, ..., for example, are colors each of which is represented by the achromatic color object illuminated by natural light having different color temperature.

The colors $C_{b1}$, $C_{b2}$, $C_{b3}$, ... are colors each of which is represented by the achromatic color object illuminated by a filament lamp having different color temperature.

The colors $C_{f1}$, $C_{f2}$, $C_{f3}$, ... are colors each of which is represented by the achromatic color object illuminated by fluorescent light having different color temperature.

Using the frequency of occurrence (the number of small areas) of each color $C_{n1}$, $C_{n2}$, $C_{n3}$, ..., $C_{b1}$, $C_{b2}$, $C_{b3}$, ..., $C_{f1}$, $C_{f2}$, $C_{f3}$, ..., a histogram shown in FIG. 3(b) is created.

In this histogram, a set of the small areas (an area E of FIG. 3(c)) belonging to the color ($C_{n2}$ in FIG. 3) with the highest frequency of occurrence is regarded as an area in which the achromatic color object exists (an achromatic color area).

Then, the average color (AR, AG, AB)$_E$ of the area E regarded as the achromatic color area is renewedly calculated. The average color (AR, AG, AB)$_E$ of the area E is the average value of respective pixel signals (R, G, B) in the area E.

Information about the average color (AR, AG, AB)$_E$ of the area E regarded as the achromatic color area is also used in a later step (step S5 of FIG. 2).

Then, the lighting color (that is, a kind of lighting and color temperature thereof) is judged as, for example, "natural light of 2100K" and the like, by the average color (AR, AG, AB)$_E$ of the area E regarded as the achromatic color area (up here, step S1 of FIG. 2).

On the other hand, in the judgment method by the average color of the whole image I (step S2 of FIG. 2), the average color (AR, AG, AB)$_{All}$ is first calculated. The average color (AR, AG, AB)$_{All}$ is the average value (or the integrated value) of the respective pixel signals (R, G, B) in the image I.

Then, the lighting color (that is, a kind of lighting and color temperature thereof) is judged as, for example, "natural light of 2000K" and the like, by the average color (AR, AG, AB)$_{All}$ of the whole image I (up here, step S2 of FIG. 2).

Meanwhile, the judgment method by the flesh-color detection (step S3 of FIG. 2) is similar to the judgment method by the achromatic color detection described above, except for a point that a flesh-color area is detected instead of the achromatic color area.

Namely, the average color (AR, AG, AB)$_i$ (i=1, 2, 3, ...) of each small area i (i=1, 2, 3, ...) of the image I is calculated.

It is judged whether or not the obtained average color (AR, AG, AB)$_i$ (i=1, 2, 3, ...) of each small area i belongs to any of predetermined plural colors $C_{n1}$, $C_{n2}$, $C_{n3}$, ..., $C_{b1}$, $C_{b2}$, $C_{b3}$, ..., $C_{f1}$, $C_{f2}$, $C_{f3}$, ..., and to which color. When it is judged that the average color (AR, AG, AB)$_i$ belongs to any of the colors, one is added to the frequency of occurrence (the number of small areas) of the corresponding color.

Here, each of the colors $C_{n1}$, $C_{n2}$, $C_{n3}$, ..., $C_{b1}$, $C_{b2}$, $C_{b3}$, ..., $C_{f1}$, $C_{f2}$, $C_{f3}$, ..., is a color which a flesh-colored object represents under each kind of lighting assumed in advance.

The colors $C_{n1}$, $C_{n2}$, $C_{n3}$, ..., for example, are colors each of which is represented by the flesh-colored object illuminated by natural light having different color temperature.

The colors $C_{b1}$, $C_{b2}$, $C_{b3}$, ... are colors each of which is represented by the flesh-colored object illuminated by a filament lamp having different color temperature.

The colors $C_{f1}$, $C_{f2}$, $C_{f3}$, ... are colors each of which is represented by the flesh-colored object illuminated by fluorescent light having different color temperature.

Using the frequency of occurrence (the number of small areas) of each color $C_{n1}$, $C_{n2}$, $C_{n3}$, ..., $C_{b1}$, $C_{b2}$, $C_{b3}$, ..., $C_{f1}$, $C_{f2}$, $C_{f3}$, ..., a histogram is created.

In this histogram, a set of the small areas (an area E) belonging to the color with the highest frequency of occurrence is regarded as an area in which the flesh-colored object exists (a flesh-colored area).

Then, the average color (AR, AG, AB)$_E$ of the area E regarded as the flesh-colored area is calculated.

Then, the lighting color (that is, a kind of lighting and color temperature thereof) is judged as, for example, "natural light of 2500K" and the like, by the average color (AR, AG, AB)$_E$ of the area E regarded as the flesh-colored area (up here, step S3 of FIG. 2).

When the lighting color is judged by each of the three judgment methods, as described above, the setting circuit 13 determines temporary white balance gain ($g_r'$, $g_b'$) (corresponding to the first adjusting parameter in claims) on the basis of the judgment results (step S4 of FIG. 2).

Taking a case where the three judgment results are "natural light of 2100K", "natural light of 2000K", and "natural light of 2500K", for example, it is regarded that the kind of lighting is the natural light, and the color temperature of lighting is the weighted average value of 2100K, 2000K, and 2500K (for example, 2050K).

The weight of the average is determined for each image I in accordance with a shooting condition of the image I stored in advance, the separately obtained distribution of color in the image I and the like.

Then, the setting circuit 13 refers to the lookup table 13c-1 in accordance with the kind of lighting (the natural light in this embodiment) and the averaged color temperature (2050K in this embodiment), to adopt values optimum for the combination of the kind of lighting and the color temperature as the temporary white balance gain ($g_r'$, $g_b'$) (up here, step S4 of FIG. 2).

Then, the setting circuit 13 multiplies the average color (AR, AG, AB)$_E$ (the average color of the area E regarded as the achromatic color area) obtained in step S1 by the temporary white balance gain ($g_r'$, $g_b'$), in the manner as shown by ($g_r'$×AR, AG, $g_b'$×AB)$_E$ (step S5 of FIG. 2).

The color ($g_r'$×AR, AG, $g_b'$×AB)$_E$ of the area E after calculation represents the approximate color of the area E after white balance adjustment with the use of the temporary white balance gain ($g_r'$, $g_b'$).

Then, the setting circuit 13 calculates deviations Δr and Δb from the balance 1:1:1 of color (R, G, B) of the area E after the calculation. The setting circuit 13 compares each of the deviations Δr and Δb with each threshold value, to judge whether or not the deviations Δr and Δb satisfy the following equation (1) (step S6 of FIG. 2).

$$|\Delta r| < 0.05 \text{ and } |\Delta b| < 0.05 \tag{1}$$

Note that, however, Δr is the deviation in the direction of color R, that is, Δr=1−G/R, and Δb is the deviation in the direction of color B, that is, Δb=1−G/B.

The threshold value "0.05" of this equation (1) corresponds to the difference in color rendering property in the same kind of lighting.

In FIGS. 4(a) and 4(b), color (R, G, B) with the deviations Δr and Δb are made visible. FIG. 4(a) shows color (R, G, B) with relatively small deviations Δr and Δb, and FIG. 4(b) shows color (R, G, B) with relatively large deviations Δr and Δb.

Figure 4:
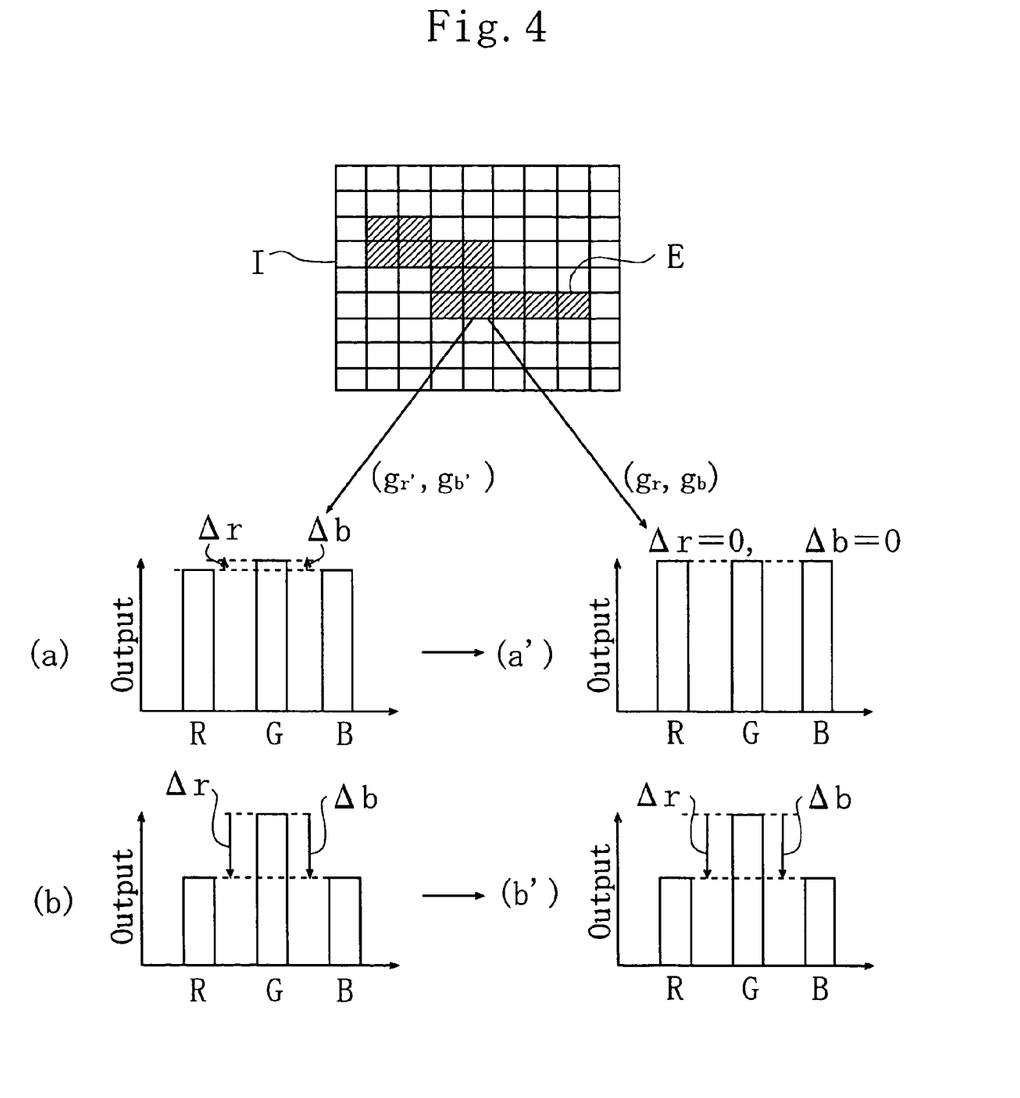
FIG. 4 is an explanatory view which explains the determination based on a threshold value according to the first embodiment of the invention.

When the deviations Δr and Δb are small as shown in FIG. 4(a) and satisfies the equation (1) (when each value of the deviations is less than the threshold value "0.05") ("YES" in step S6 of FIG. 2), the temporary white balance gain ($g_r'$, $g_b'$) is corrected so that each value of the deviations Δr and Δb becomes zero as shown in FIG. 4(a') (step S7 of FIG. 2). Corrected values are adopted as white balance gain ($g_r$, $g_b$) to be set in the white balance circuit 14 (step S8 of FIG. 2).

On the other hand, when the deviations Δr and Δb are large as shown in FIG. 4(b) and does not satisfy the equation (1) (when at least one value of the deviations is equal to or more than the threshold value "0.05")("NO" in step S6 of FIG. 2), the temporary white balance gain ($g_r'$, $g_b'$) as-is becomes white balance gain ($g_r$, $g_b$) to be set in the white balance circuit 14, as shown in FIG. 4(b') (step S8 of FIG. 2).

Therefore, when an amount of each of the deviations Δr and Δb is less than that corresponding to the difference in color rendering property, the values of the temporary white balance gain are corrected in a direction of emphasizing the judgment result by the achromatic color detection.

When an amount of each of the deviations Δr and Δb is equal to or more than that corresponding to the difference in color rendering property, the correction is not carried out.

According to the white balance adjustment with the white balance gain ($g_r$, $g_b$) set as described above, it is possible to increase only the probability of success, keeping the low probability of failure.

It is preferable that the threshold value of the equation (1) is selected on the basis of images of various subjects shot experimentally. For example, "0.1" and the like may be selected instead of "0.05".

Second Embodiment

The second embodiment of the present invention will be described with reference to FIGS. 5 and 6.

This is also an embodiment of an electronic camera. In this embodiment, only difference from the electronic camera according to the first embodiment will be described.

Figure 5:
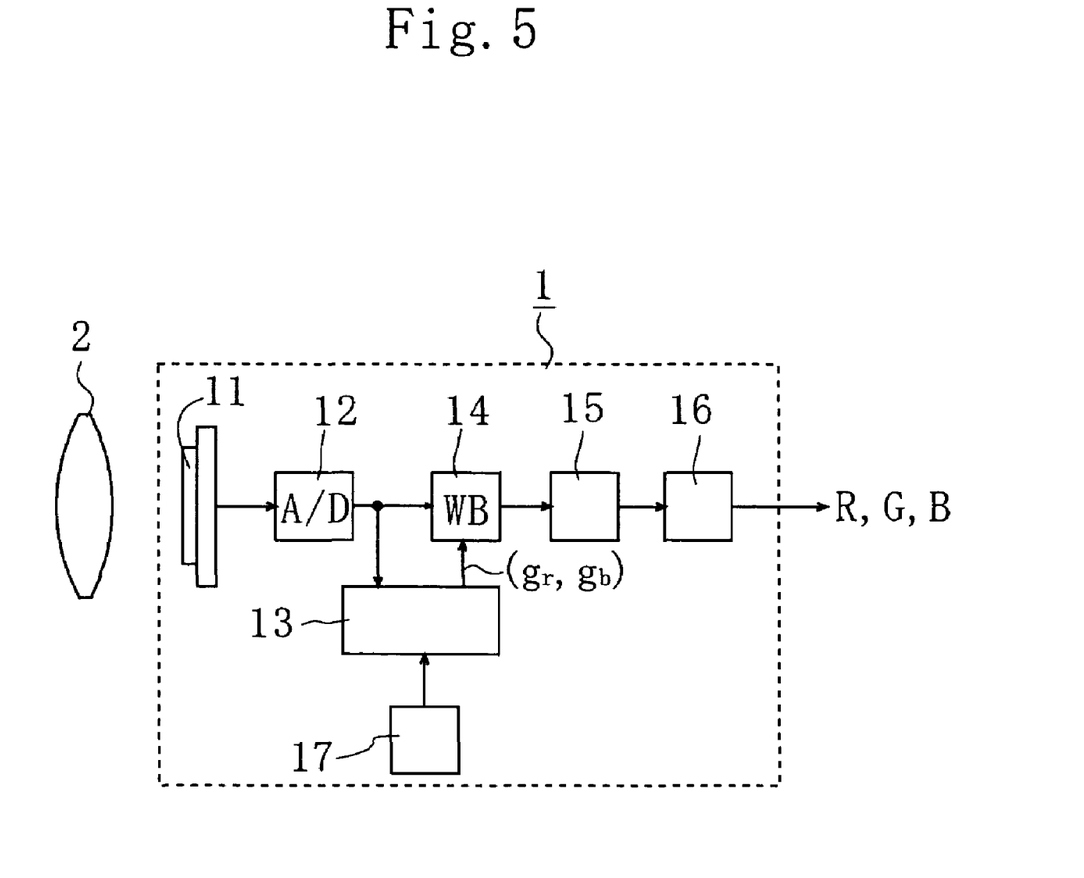
FIG. 5 is a block diagram showing the schematic structure of an electronic camera according to a second embodiment of the invention.

FIG. 5 is a block diagram showing the schematic structure of the electronic camera according to this embodiment.

A camera body 1 of the electronic camera according to this embodiment is provided with an operation member 17, with which a user inputs lighting information.

The lighting information includes, for example, shooting environment of an image I (for example, in a room with fluorescent light, under a clear sky, at sunset, in a room with a filament lamp and the like).

The lighting information is taken in a setting circuit 13.

When setting white balance gain ($g_r$, $g_b$) at an image I, the setting circuit 13 refers to the lighting information, in addition to referring to the image I.

The operation of the setting circuit 13 when setting the white balance gain ($g_r$, $g_b$) at a given image I according to this embodiment will be hereinafter described.

Figure 6:
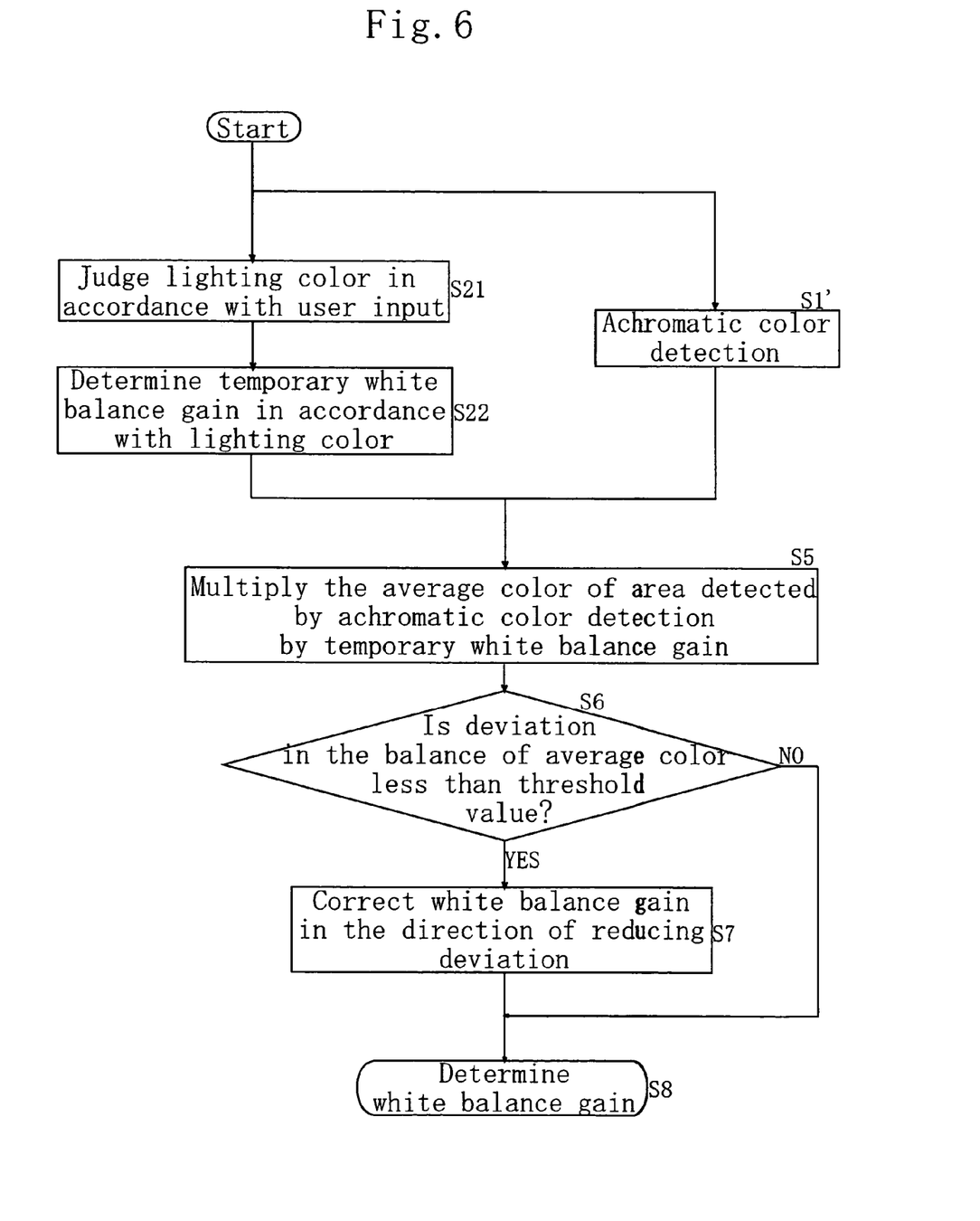
FIG. 6 is a flow chart showing the operation of a setting circuit 13 according to the second embodiment of the invention.

FIG. 6 is a flow chart showing the operation of the setting circuit 13 according to this embodiment.

First, the setting circuit 13 judges a kind of lighting used for the shooting of the image I and color temperature as, for example, "natural light of 5000K" and the like, on the basis of the lighting information (for example, "under a clear sky" input by the user (step S21 of FIG. 6). The setting circuit 13 refers to a lookup table 13c-1 in accordance with the kind of lighting and the color temperature, to adopt values optimum for the combination thereof as temporary white balance gain ($g_r'$, $g_b'$) (step S22 of FIG. 6).

The setting circuit 13, in the meantime, detects an achromatic color area E in the image I (step S1' of FIG. 6). A method for the detection is the same as that for detecting the achromatic color area E in step S1 of FIG. 2 (refer to FIG. 3).

Then, the average color $(AR, AG, AB)_E$ of the achromatic color area E is obtained. The average color $(AR, AG, AB)_E$ is multiplied by the temporary white balance gain ($g_r'$, $g_b'$), in the manner as shown by $(g_r' \times AR, AG, g_b' \times AB)_E$ (step S5 of FIG. 6).

Furthermore, the setting circuit 13 calculates deviations Δr and Δb from the balance 1:1:1 of color (R, G, B) of the area E after calculation. The setting circuit 13 compares each of the deviations Δr and Δb with each threshold value, to judge whether or not the deviations Δr and Δb satisfy the equation (1) (step S6 of FIG. 6).

When the deviations Δr and Δb satisfy the equation (1) (when each value of the deviations is less than the threshold value) ("YES" in step S6 of FIG. 6), the temporary white balance gain ($g_r'$, $g_b'$) is so corrected that each value of the deviations Δr and Δb becomes zero (step S7 of FIG. 6). Corrected values are adopted as white balance gain ($g_r$, $g_b$) to be set in a white balance circuit 14 (step S8 of FIG. 6).

When the deviations Δr and Δb do not satisfy the equation (1) (when at least one value of the deviations is equal to or more than the threshold value "0.05") ("NO" in step S6 of FIG. 6), the temporary white balance gain ($g_r'$, $g_b'$) as-is becomes white balance gain ($g_r$, $g_b$) to be set in the white balance circuit 14 (step S8 of FIG. 6).

Therefore, also in the electronic camera according to this embodiment in which the temporary white balance gain ($g_r'$, $g_b'$) is set in accordance with user input, as described above, when an amount of each of the deviations Δr and Δb is less than that corresponding to difference in color rendering property, the values of the temporary white balance gain are corrected in a direction of emphasizing the judgment result by achromatic color detection.

When an amount of each of the deviations Δr and Δb in the balance is equal to or more than that corresponding to the difference in color rendering property, on the other hand, the correction is not carried out.

Therefore, as in the case of the electronic camera according to the first embodiment, it is possible to increase only the probability of success, keeping the low probability of failure.

Third Embodiment

The third embodiment of the present invention will be described with reference to FIG. 7.

This is also an embodiment of an electronic camera. In this embodiment, only difference from the electronic camera according to the first embodiment will be described.

The structure of the electronic camera according to this embodiment is the same as that of the electronic camera according to the first embodiment shown in FIG. 1.

The operation of a setting circuit 13 (refer to FIG. 1) is basically the same as that of the first embodiment.

The following equation (2) is used for judgment in step S6 (refer to FIG. 2) instead of the equation (1).

$$-0.025 < \Delta r < 0.075 \text{ and}$$
$$-0.025 < \Delta b < 0.075 \quad (2)$$

In the equation (2), $\Delta r = 1 - G/R$ and $\Delta b = 1 - G/B$.

Here, Δr is positive in the direction of color R (in a direction that color R is intense as compared with color G), and Δb is positive in the direction of color B (in a direction that color B is intense as compared with color G).

In the equation (2), there is a disparity between a threshold value in the direction of color G for the deviations Δr and Δb, and a threshold value in the direction of color R and B. The former threshold value is "0.075" and the latter threshold value is "0.025".

Figure 7:
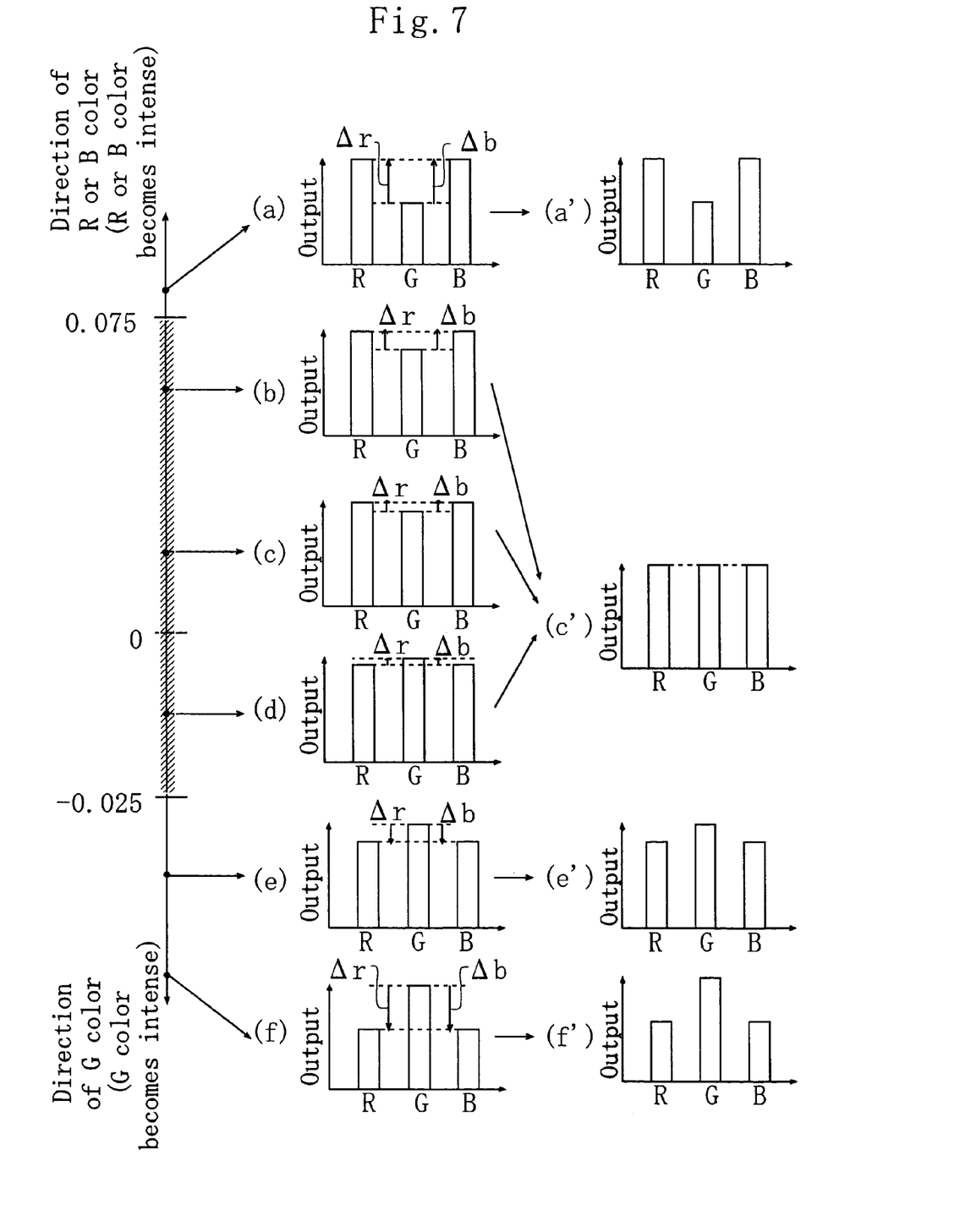
FIG. 7 is an explanatory view which explains the determination based on a threshold value according to the second embodiment of the invention.

In FIG. 7, color (R, G, B) with the deviations Δr and Δb are made visible. In FIG. 7, color R or B becomes intense with upward, and color G becomes intense with downward.

According to the equation (2) in which the threshold value in the direction of G is set restrictively, there may occur a situation where even if amounts of the deviations are equal to each other as shown in FIGS. 7(b) and 7(e), temporary white balance gain ($g_r'$, $g_b'$) is not corrected (FIG. 7(e')) when the deviations are in the direction of G (FIG. 7(e)), but temporary white balance gain ($g_r'$, $g_b'$) is corrected (FIG. 7(c')) only when the deviations are in the direction of R or B (FIG. 7(b)).

Adopting the disparity in the direction of the deviation, as described above, it becomes possible to increase the probability of success in white balance adjustment as in the case of the first embodiment, with preventing failure in the white balance adjustment to a specific image.

The specific image is an image such as "an image of a lawn shot under natural light" and the like, in which green is dominant on the whole in spite of the fact that lighting other than fluorescent light is adopted.

In the image like this, there is a possibility that the area of the lawn is mistakenly regarded as an achromatic color area E. If prime importance is placed on judgment result by achromatic color detection in this case, the white balance gain is corrected in a direction suited for the lighting of the fluorescent light (in the direction of reducing green color). Therefore, the white balance adjustment ends in failure, and the color of the image becomes extremely unnatural.

Meanwhile, if the threshold value in the direction of color G is set restrictively as described in this embodiment, the white balance gain becomes hard to be corrected in the direction of reducing green color, thereby being able to reduce the possibility of failure.

When the threshold value in the direction of color G is set restrictively, there is a possibility that the white balance adjustment to "a normal image shot under the fluorescent light" becomes insufficient.

However, the insufficient adjustment only leaves color specific to the fluorescent light (green color) in an image, and hence it does not matter for the user who knows from his/her experience that an image shot under the fluorescent light is greenish.

It is preferable that the threshold value of the equation (2) is selected on the basis of images of various subjects shot experimentally. For example, "−0.05", "0.12" and the like may be selected instead of "−0.025" and "0.075", respectively.

Other

In the electronic camera according to each embodiment described above, image data after the white balance adjustment (a pixel signal group) is stored in the recording medium, but image data before the white balance adjustment (raw data) may be stored with the information of the white balance gain ($g_r'$, $g_b$) (RAW record).

The information of the temporary white balance gain ($g_r'$, $g_b'$) and the like may also be attached, in addition to the information of the white balance gain ($g_r$, $g_b$).

In the electronic camera according to each embodiment described above, information is stored in the recording medium, but the information may be transferred to an external computer, another electronic camera or the like instead of storing it in the recording medium.

In the electronic camera according to the first and third embodiments described above, the lighting color is judged by the weighted average, but may be selectively judged instead.

In the electronic camera according to each embodiment described above, the temporary white balance gain ($g_r'$, $g_b'$) is set on the basis of plural kinds of judgment different from each other, or judgment in accordance with a setup by the user. The temporary white balance gain ($g_r'$, $g_b'$), however, may be set on the basis of any other known judgment, as long as it is based on at least one kind of judgment other than the achromatic color judgment. There is judgment, for example, in accordance with contents preset by the user.

A general-purpose computer may carry out part or the whole of operation of the setting circuit 13 and the white balance circuit 14 according to each embodiment described above.

In this case, a program for the part or the whole of the operation may be written in a computer-readable recording medium (CD-ROM) and the like in advance, and the computer may run the program stored in the recording medium.

Otherwise, the program may be downloaded into the computer via the Internet.

The invention is not limited to the above embodiments and various modifications may be made without departing from the spirit and scope of the invention. Any improvement may be made in part or all of the components.

What is claimed is:

1. An image processing unit comprising:
    a first setting unit for setting a value of a first adjusting parameter for white balance adjustment to be applied to a whole image of a subject, based on a judgment or judgments including a judgment other than by achromatic color detection;
    a calculation unit for calculating a deviation of a color in an area in comparison to an achromatic color when the area of the image detected by achromatic color detection is subjected to the white balance adjustment with the first adjusting parameter; and
    a second setting unit for not correcting the value of the first adjusting parameter when the deviation is equal to or more than a threshold value, and for correcting the value of the first adjusting parameter in a direction of reducing the deviation and setting the corrected value as a second adjusting parameter when the deviation is less than the threshold value.

2. The image processing unit according to claim 1, further comprising an adjustment unit in which the whole image is subjected to the white balance adjustment by the first adjusting parameter after processing by the second setting unit.

3. An electronic camera comprising:
    an imaging sensor for taking an image of a subject; and
    a circuit part for carrying out calculation on the basis of the image output from the imaging sensor,
    the circuit part including
    a first setting unit for setting a value of a first adjusting parameter for white balance adjustment to be applied to a whole image of a subject, based on a judgment or judgments including a judgment other than by achromatic color detection;
    a calculation unit for calculating a deviation of a color in an area in comparison to an achromatic color when the area of the image detected by achromatic color detection is subjected to the white balance adjustment with the first adjusting parameter; and a second setting unit for not correcting the value of the first adjusting parameter when the deviation is equal to or more than a threshold value, and for correcting the value of the first adjusting parameter in a direction of reducing the deviation and setting the corrected value as a second adjusting parameter when the deviation is less than the threshold value.

4. The electronic camera according to claim 3, wherein the circuit part includes an adjustment unit in which the whole image is subjected to the white balance adjustment by the first adjusting parameter after processing by the second setting unit.

5. The electronic camera according to claim 3, wherein the first setting unit sets the value of the first adjusting parameter on the basis of lighting color of the subject, which is judged by at least two kinds of methods different from each other.

6. The electronic camera according to claim 3, wherein the first setting unit sets the value of the first adjusting parameter in accordance with user input.

7. The electronic camera according to claim 3, wherein the threshold value of the deviation corresponds to a difference in color rendering property in the same kind of lighting.

8. The electronic camera according to claim 3, wherein the threshold value of the deviation in a direction of green color is smaller than the threshold value of the deviation in a direction opposite to green color.

9. The electronic camera according to claim 8, wherein the threshold value of the deviation corresponds to a difference in color rendering property in the same kind of lighting.

10. A computer-readable storage medium encoded with an image processing program for subjecting an image of a subject to white balance adjustment, the image processing program instructing a computer to execute:

a first setting step of setting a value of a first adjusting parameter for the white balance adjustment to be applied to a whole image of the subject, based on a judgment or judgments including a judgment other than by achromatic color detection;

a calculation step of calculating a deviation of a color in an area in comparison to an achromatic color when the area of the image detected by achromatic color detection is subjected to the white balance adjustment with the first adjusting parameter; and a second setting step of not correcting the value of the first adjusting parameter when the deviation is equal to or more than a threshold value, and of correcting the value of the first adjusting parameter in a direction of reducing the deviation, and setting the corrected value as a second adjusting parameter when the deviation is less than the threshold value.

11. The computer-readable storage medium according to claim 10, further instructing the computer to execute an adjustment step of subjecting the whole image to the white balance adjustment by the first adjusting parameter after processing by the second setting step.

* * * * *